Sept. 14, 1965 H. NOLTE 3,205,961
MEANS FOR LATERALLY ADJUSTING GROUND ENGAGING ENDLESS TRACKS
Filed April 7, 1960
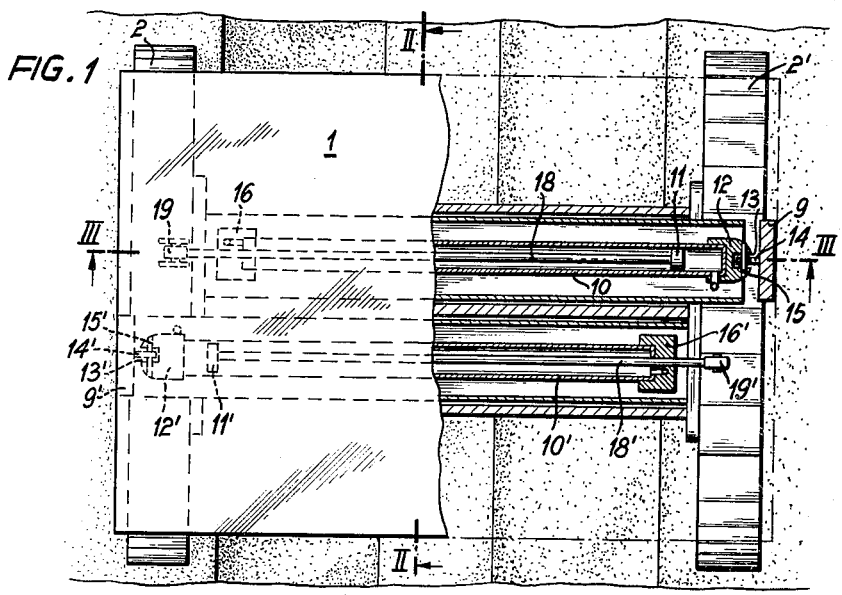
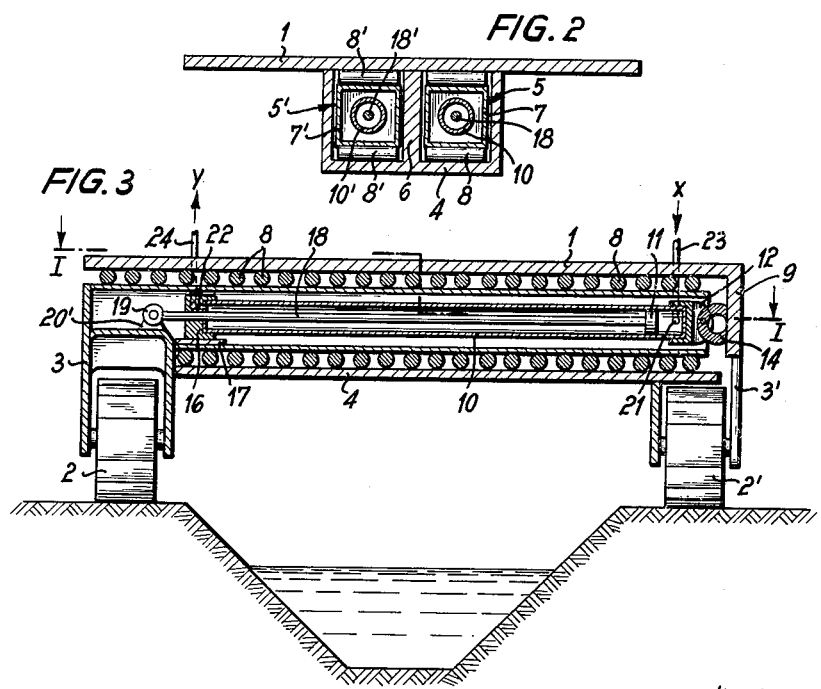
INVENTOR
Hans Nolte
By
Lowry & Rinehart
ATTYS.

3,205,961
MEANS FOR LATERALLY ADJUSTING GROUND ENGAGING ENDLESS TRACKS
Hans Nolte, Wunstorf, near Hanover, Germany
Filed Apr. 7, 1964, Ser. No. 357,984
5 Claims. (Cl. 180—9.48)

This invention relates to a device for varying the width between transversely adjacent endless tracks of vehicles, especially mobile working machines having a considerable dead weight and/or being subjected to heavy loads, the endless tracks or wheels of which are mounted on two bearing boxes arranged in an axle box to be slidingly movable therein in a telescoping fashion, i.e. in opposite directions in relation to each other, the said bearing boxes being pivoted to pressure fluid operated double-acting piston and cylinder devices incorporated in the bearing boxes.

In a known device for varying the track gage of twin wheels having the outer wheel seated on a telescopic axle inserted in a stationary hollow axle mounted on the chassis and carrying the inner wheel, the telescopic axle can be displaced and adjusted in relation to the stationary hollow axle by operating a screw spindle by means of a crank handle to be applied from outside. In this case, the variation of the gage is limited to an adjustment of the outer wheels and can be effected only in a stopped vehicle after the twin wheel has been brought in an elevated position in which the outer wheel to be adjusted has no ground contact.

For adjusting the track gage of the individual wheels of motor cars a device has become known in which the wheel supports are connected with the piston rods of two pressure fluid operated opposite pistons arranged in a common cylinder disposed transversely of the longitudinal axis of the vehicle, and a control is provided within the driver's reach. By adequately operating the control, the pressure fluid can be admitted into the cylinder either behind or ahead of the pistons so that it is possible to adjust the wheels between a minimum and a maximum axial spacing, the distance by which the wheels can be spaced apart from each other amounting at most to approximately half the distance by which the wheels are spaced apart from each other when adjusted to their minimum spacing.

In this known device, the piston rods and the cylinder constitute a telescoping wheel axle which has to support the whole load composed of the dead weight of the superstructure and of the charged load. Because of the sag of the piston rods and the resulting frictional resistance between the bores in the cylinder end faces and the piston rods passing therethrough, it is impossible to use the known gage adjusting devices—even if employing heavily designed piston rod cross sections—in mobile plants or railless vehicles which have superstructures of considerable dead weight and, in addition, are charged with heavy loads as is the case, for example, with mobile ditch cleaners in which the platform carrying the working devices and conveying facilities for lateral material discharge has to support a weight of several tons. To obtain continuous and relatively rapid progress of the ditch cleaning operations it is however desired to vary the width between the running elements, which usually are in the form of endless tracks because of the heavy loads and the roughness of the bank strips used as runways, without having to stop the vehicle, thereby to render possible continuous adaptation of the running elements to the various widths of the ditch to be cleaned.

For the practical utilization of a device for varying the width between the endless tracks of vehicles subjected to heavy loads or of mobile working machines such as the aforementioned ditch cleaners, which have a considerable dead load, it should be required that the adjusting cylinders and the piston rods of the said device possibly remain entirely free from radial stresses so as to avoid jamming by which the adjustability would be rendered difficult or even impossible and by which, moreover, a variation of the width between the running elements would be permitted within a relatively small range only.

In a known design of a telescoping front wheel axle for motor vehicles, especially working machines used in agriculture, forestry and in the building industry, this requirement has been met by incorporating the adjusting cylinders in coaxial relationship in a hollow axle housing tube and by inserting axle tubes in both ends of the axle housing tubes and connecting them by means of bolts. Such an arrangement provides a range of adjustment which in the most favorable case amounts to about one third of the distance by which the wheels are spaced apart from each other when they have been adjusted to the narrowest possible track gage. For carrying out gage adjustment in the known telescopic front wheel axle, the locking means of the track rods must be loosened and, after adjustment, tightened again. This requires stopping the vehicle each time track adjustment is necessary.

It is the object of the present invention to provide a device of the initially specified type which permits wheel or track gage adjustment within a wide range exceeding the length of the axle housing tube accommodating the adjusting cylinders and which permits such adjustment without having to stop the vehicle.

According to the invention this is attained in that both internal tubes are arranged in separate chambers of the axle housing tube, which chambers are disposed in series with regard to the longitudinal direction of the vehicle, and in that either of the displaceable box-shaped internal tubes has approximately the same length as the axle housing tube, the adjusting cylinders, which extend over the whole length of the chambers, being pivoted to the end wall of the chambers, whereas their piston rods are pivoted to the box-shaped internal tubes in proximity of the wheels.

The device proposed by the invention provides a range of adjustability amounting to more than twice the minimum wheel or track gage, and that without having to stop the vehicle and without subjecting the adjusting elements to bending stresses and incurring unduly high pressures per unit surface area. By these features, the range of application of expensive heavy equipment is considerably widened and especially the economic employment of heavy ditch cleaners, in which the gage of the endless tracks or wheels must be continuously adapted to the often considerably varying ditch width, is rendered possible.

To keep the friction resistance occurring when extending and retracting the box-shaped internal tubes, the outer surfaces of the top and bottom walls thereof may be advantageously supported and guided by means of rollers rotatably mounted within the chambers.

The inventive conception of keeping vertical stresses, if possible, altogether away from the cylinders accommodating the movable piston rod can be completely realized in that either cylinder is provided with a cap at its rear end with respect to the advancing direction of the piston, said rear end of the pressure cylinder being pivoted by means of said cap to a horizontal bolt extending in the longitudinal direction of the vehicle and arranged to be stationary in relation to the axle housing tube, whereas the free end of the piston rod is pivoted by means of a hinge to a support rigidly connected with the associated internal tube and mounting the wheel at this end of said bearing box, the hinge axle of said hinge extending parallel to said horizontal bolt.

Since in such an articulated arrangement the cylinders are allowed to perform vertical movements in relation to the box-shaped internal tubes, there is no risk of transmitting even part of the vertical stresses to the cylinders and the piston rods. The pivot joints, moreover, facilitate the assembly and disassembly of the movable parts of the device when repair becomes necessary.

A preferred embodiment of the invention will now be described by way of example and with reference to the accompanying drawing, in which:

FIG. 1 is a top plan view, partly in horizontal section taken on the line I—I of FIG. 3, of a device for varying the wheel or track gage of railless vehicles, according to the invention;

FIG. 2 is a central longitudinal section taken on the line II—II of FIG. 1; and

FIG. 3 is a cross section taken on the line III—III of FIG. 1.

With reference now to FIGS. 1 to 3 of the drawing, the device for varying the width between the endless tracks or wheels of endless track-type vehicles according to the invention is incorporated in a chassis or running gear of a mobile ditch cleaner having a platform 1 carrying the working and material conveying equipment, not shown. The running gear comprises two endless tracks 2 and 2' disposed in a known manner around driving wheels and guide wheels mounted on supports 3 and 3'.

When the endless tracks 2 and 2' are traveling on the banks on either side of the ditch to be cleaned, the working equipment is run along the bottom and slopes of the ditch to remove dirt and plants and charge the material removed from the ditch onto the conveying equipment by which it is dumped in a continuous line on one of the banks.

On the platform 1 there is a seat or stand for the driver operating the driving engine, the steering mechanism and the ditch cleaning equipment as well as its drives. Within the reach of the driver, a control is arranged on the platform 1 to permit the distance of the two endless tracks 2 and 2' from the central longitudinal axis of the ditch cleaner to be uniformly varied and thus the track gage to be adapted to varying ditch widths, without stopping the vehicle, so that it is possible to have the endless tracks 2 and 2' always traveling as close as possible to the slopes of the banks. The gage adjusting device proposed by the present invention and serving the above-specified purpose is so constructed that the functioning and easy or smooth adjustability thereof is not affected by the considerable dead weight of the ditch cleaner and the load added thereto in the form of the material removed from the ditch and handled by the cleaning and conveying equipment of the vehicle.

On the underside of the platform 1 there is provided an axle housing tube 4 extending transversely of the longitudinal axis of the chassis, which axle housing tube 4 in the represented embodiment is made in one piece with the platform 1, as can be seen especially from FIG. 2. The axle housing tube 4 defines two open-ended chambers 5 and 5' separated from each other in the longitudinal direction by a central partition wall 6. In either of the two chambers 5 and 5', which have an elongated rectangular cross section, a square section box-shaped internal tube 7 or 7', respectively, is inserted so as to be longitudinally displaceable therein. Between the outer surfaces of the top and bottom walls of the box-shaped internal tubes 7 and 7' and the corresponding ceilings and bottoms of the chambers 5 and 5', relatively closely spaced rollers 8 and 8' are provided which are rotatably mounted in the vertical side walls of the chambers 5 and 5'. With its end situated outside the respective chamber 5 or 5', either of the internal tubes 7 and 7' is firmly connected with the respective support 3 or 3' of the driving and guide wheels for that one of the endless tracks 2 and 2' which is on the same side of the chassis as the case and projecting from the respective housing 5 or 5'. On the opposite side, the transverse chambers 5 and 5' are covered completely or at least partly by a downwardly directed flange 9 or 9', respectively, of the platform 1.

Either of the internal tubes 7 and 7' encloses a piston and cylinder device consisting of a pressure cylinder 10 or 10', respectively, in which a respective piston 11 or 11' is reciprocable by hydraulic or pneumatic pressure. Each of the cylinders 10 and 10' is provided with a cap 12 or 12', respectively, at its end opposite the associated endless track 2 or 2', respectively. The caps 12 and 12' are provided with slot-like recesses 13 and 13' by means of which they are attached to mounting members 14 and 14' in the shape of annular segments or circular disc segments fixed to the inner surface of the flanges 9 and 9' of the platform 1. The caps 12 and 12' are secured to the mounting members 14 and 14' by means of cross bolts 15 and 15' in such a manner as to permit vertical pivotability of the cylinders 10 and 10'. With its opposite end, either of the cylinders 10 and 10' is fixed on a respective mounting 16 or 16' inserted in the chambers 5 and 5' at the free end thereof and supported on the bottom of the chambers 5 and 5' by means of a respective slide plate 17 or 17'. In the vertical direction, the mounting members 14 and 14' do not entirely fill up the chambers 5 and 5'.

The pistons 11 and 11' are fitted with piston rods 18 and 18' which extend through a central bore in the mountings 16 and 16' and which with an eye 19 or 19', respectively, are pivoted to a respective hinge part 20 or 20' on the supports 3 and 3' of the endless tracks 2 and 2'. In the caps 12 and 12' as well as in the mountings 16 and 16' there are provided angular bores 21 and 22 through which a pressure fluid can be fed from conduits 23 or 24 into the cylinders 10 and 10' to act upon the pistons 11 and 11'. When pressure fluid is admitted to the leading end of the pistons 11 and 11' through the conduits 23, the amount of pressure fluid entrapped in the cylinders 10 and 10' behind the trailing end of the pistons 11 and 11' can escape through the conduits 24 and, vice versa, when pressure fluid is admitted to the trailing end of the pistons 11 and 11' for their return stroke, the amount of pressure fluid entrapped in the cylinders 10 and 10' ahead of the leading end of the pistons 11 and 11' can escape through the conduits 23. By a synchronizing valve connected in series it is obtained that the two pistons 11 and 11' are acted upon with uniform pressure so that the carrying cases 7 and 7' are reciprocated at equal speed and by the same distance. The conduits 23 and 24, which may be in the form of pipes or hoses, pass through elongated holes in the vertical side walls of the box-shaped internal tubes 7 and 7' and then are led upwardly through bores in the platform 1 to the control disposed within the driver's reach.

FIG. 3 shows the pressure fluid operated adjusting device for the endless track 2 arranged on the left of the chassis. The adjusting device for the endless caterpillar track 2' provided on the right of the chassis comprises the same parts in symmetrical arrangement. In FIGS. 1 and 3, the endless tracks 2 and 2' are adjusted to their smallest possible spacing from each other, say 3.5 m. If at this state, by appropriately operating the control means, pressure fluid is fed in the direction of arrow x through the conduits 23 and introduced into the cylinders 10 and 10' to act upon the leading end faces of the pistons 11 and 11', the piston rods 18 and 18' will positively force the endless tracks 2 and 2' outwardly, taking along the internal tubes 7 and 7', until the desired gage of the tracks 2 and 2' has been reached. During this operation, the amount of pressure fluid behind the trailing end of the pistons 11 and 11' will escape from the cylinders 10 and 10' in the direction of arrow y through the conduits 24.

When the internal tubes 7 and 7' are carried along by the supports 3 and 3' of the endless tracks 2 and 2', they slide on the rollers 8 and 8' and take up the load resting on the platform 1 so that no stresses are transmitted to the piston rods 18 and 18'.

The maximum gage to which the endless tracks 2 and 2′ can be adjusted amounts to approximately twice the minimum gage, i.e. with the assumed minimum width of 3.5 m. between the tracks 2 and 2′, the maximum spacing to which they could be adjusted from other in this case would be about 7.0 m. Even in the latter case, i.e. when the tracks 2 and 2′ are spaced apart from each other by the maximum distance possible, substantially half the length of the internal tubes 7 and 7′ is still supported in the chambers 5 and 5′ through the intermediary of the rollers 8 and 8′. By this constructional feature it is ensured that even in cases in which the platform is subjected to heaviest loads, unduly great pressure per unit area of the remaining rollers then transmitting the stresses is reliably precluded so that there is no risk of deforming the piston rods 18 and 18′ or of excessive friction at the piston rod passages.

If the tracks 2 and 2′ are to be readjusted to a narrower gage, the control means must be so operated that the pressure fluid is reversed and fed through the respective conduit 24 into the cylinders 10 and 10′ to act upon the trailing end of the pistons 11 and 11′ and make the pressure fluid on the leading end side of the pistons 11 and 11′ escape through the respective conduit 23.

As made clear by the above explanations, the spacing between the endless tracks 2 and 2′ can be adjusted while the vehicle is traveling. Expediently, the end positions of the pistons 11 and 11′ are limited by abutments, for example by providing appropriate stops in the cylinders 10 and 10′, against which stops the pistons 11 and 11′ can abut in their end position.

To facilitate driving over rough bank strips of the ditch to be cleaned, one of the two endless tracks 2 and 2′ may be pendulously suspended from the respective support 3 or 3′ in a manner known per se. To reinforce the box-shaped internal tubes 7 and 7′, these may be provided with regularly spaced reinforcing plates (not shown) inserted by welding and having central apertures permitting the cylinders 10 and 10′ to pass therethrough.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. For example, the device for varying or adjusting the endless tracks proposed by the invention can also be incorporated in other vehicles and machines such as heavy bulldozers, crawler tractors, semi-trailers, flatbed trailers and the like heavy load transport means.

I claim:

1. A device for laterally adjusting endless tracks of a vehicle comprising a frame, at least one pair of box-shaped elongated tubes supported by said frame, the longitudinal axis of said tubes being normal to transversely spaced endless tracks of the vehicle, said tubes extending substantially entirely transversely across said vehicle, a cylinder housed in each tube, a piston reciprocally mounted in each cylinder, each cylinder being secured to one of said endless tracks, a piston rod secured to each piston, each piston rod being secured to the other of said endless tracks, means for introducing fluid into and withdrawing fluid from said cylinder whereby said endless tracks can be selectively adjusted toward and away from each other, and said tubes, cylinder and piston rods being of substantially the same length.

2. A device for laterally adjusting endless tracks of a vehicle comprising a frame, at least one pair of box-shaped elongated tubes supported by said frame, the longitudinal axis of said tubes being normal to transversely spaced endless tracks of the vehicle, said tubes extending substantially entirely transversely across said vehicle, a cylinder housed in each tube, a piston reciprocally mounted in each cylinder, each cylinder being secured to one of said endless tracks, a piston rod secured to each piston, each piston rod being secured to the other of said endless tracks, means for introducing fluid into and withdrawing fluid from said cylinder whereby said endless tracks can be selectively adjusted toward and away from each other, and a plurality of rollers between portions of said tubes and said frame.

3. A device for laterally adjusting endless tracks of a vehicle comprising a frame, at least one pair of box-shaped elongated tubes supported by said frame, the longitudinal axis of said tubes being normal to transversely spaced endless tracks of the vehicle, said tubes extending substantially entirely transversely across said vehicle, a cylinder housed in each tube, a piston reciprocally mounted in each cylinder, each cylinder being secured to one of said endless tracks, a piston rod secured to each piston, each piston rod being secured to the other of said endless tracks, means for introducing fluid into and withdrawing fluid from said cylinder whereby said endless tracks can be selectively adjusted toward and away from each other, and said tubes, cylinder and piston rods being of substantially the same length, each of said pressure cylinders being provided with a cap, a horizontal bolt extending in the longitudinal direction of said vehicle securing each cap to an associated endless track, and the securement of each piston rod to said other endless track being by means of a hinge having an axis parallel to the axes of said bolts.

4. A device for laterally adjusting endless tracks of a vehicle comprising at least a pair of box-shaped elongated tubes, said tubes being carried by a frame of said vehicle transversely of the longitudinal axis thereof, a pair of transversely spaced endless tracks, a chamber in each tube, a cylinder in each chamber, a piston reciprocally carried by each cylinder, an end of said cylinder being secured to one of said endless tracks, a piston rod coupled to each piston, an end of said piston rod being secured to the other of said endless tracks, means for introducing fluid into and withdrawing fluid from said cylinders whereby said endless tracks can be selectively adjusted toward and away from each other, a plurality of rows of rollers between each chamber and tube, said tubes, chambers, piston rods and cylinder being of substantially identical length and the length of the tubes, chambers, piston rods and cylinders being substantially identical to the width of a frame of said vehicle carrying said tubes.

5. A device for laterally adjusting endless tracks of a vehicle comprising at least a pair of box-shaped elongated tubes, said tubes being carried by a frame of said vehicle transversely of the longitudinal axis thereof, a pair of transversely spaced endless tracks, a chamber in each tube, a cylinder in each chamber, a piston reciprocally carried by each cylinder, an end of said cylinders being secured to one of said endless tracks, a piston rod coupled to each piston, an end of each piston rod being secured to the other of said endless tracks, means for introducing fluid into and withdrawing fluid from said cylinders whereby said endless tracks can be selectively adjusted toward and away from each other, a plurality of rows of rollers between each chamber and tube, said tubes, chambers, piston rods and cylinder being of substantially identical length, the length of the tubes, chambers, piston rods and cylinders being substantially identical to the width of a frame of said vehicle carrying said tubes, the securing of said cylinders to said one endless track being by means of pivot means having axes parallel to the longitudinal axis of the vehicle, and the securing of said piston rods to said other endless track being by means of pivot means having axes parallel to the longitudinal axis of the vehicle.

(References on following page)

References Cited by the Examiner

UNITED STATES PATENTS

| | | | |
|---|---|---|---|
| 518,268 | 4/94 | McKnight. | |
| 2,365,167 | 12/44 | Billings | 280—34 X |
| 2,681,231 | 6/54 | Kondracki | 180—9.48 |
| 2,767,995 | 10/56 | Stout | 280—34 |
| 2,894,341 | 7/59 | Amthor | 280—34 X |
| 3,116,085 | 12/63 | Uttley | 280—34 X |

BENJAMIN HERSH, *Primary Examiner.*

ARTHUR L. LA POINT, *Examiner.*